(12) United States Patent
Yumoto et al.

(10) Patent No.: US 9,282,801 B2
(45) Date of Patent: Mar. 15, 2016

(54) ARTIFICIAL NAIL

(75) Inventors: Manabu Yumoto, Osaka (JP);
Masayuki Miyamoto, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/009,495

(22) PCT Filed: Apr. 2, 2012

(86) PCT No.: PCT/JP2012/059615
§ 371 (c)(1),
(2), (4) Date: Oct. 2, 2013

(87) PCT Pub. No.: WO2012/137963
PCT Pub. Date: Oct. 11, 2012

(65) Prior Publication Data
US 2014/0041677 A1    Feb. 13, 2014

(30) Foreign Application Priority Data

Apr. 4, 2011  (JP) .................... 2011-082625

(51) Int. Cl.
*A45D 31/00* (2006.01)
*G06F 3/0354* (2013.01)

(52) U.S. Cl.
CPC ............ *A45D 31/00* (2013.01); *G06F 3/03545* (2013.01)

(58) Field of Classification Search
CPC ............ A45D 31/00; A45D 2031/005; A45D 2029/008; G06F 3/03545

USPC .................................................. 132/73, 285
See application file for complete search history.

(56) References Cited

U.S. PATENT DOCUMENTS 3,478,756 A * 11/1969 Gotz et al. ...................... 132/73
8,730,194 B2 * 5/2014 Vellanki ........................ 345/173
2005/0121048 A1 * 6/2005 Han ............................... 132/73
2006/0191551 A1   8/2006 Han
(Continued)

FOREIGN PATENT DOCUMENTS

CN    101990407 A     3/2011
JP    05-139931 A     6/1993
(Continued)

OTHER PUBLICATIONS

Terence Bell, Electrical Conductivity in Metals What makes metals conductive?  http://metals.about.com/od/properties/a/Electrical-Conductivity-In-Metals.htm, pp. 1-3, publication date unknown.*
(Continued)

*Primary Examiner* — Robyn Doan
*Assistant Examiner* — Tatiana Nobrega
(74) *Attorney, Agent, or Firm* — Birch, Stewart, Kolasch & Birch, LLP (57) ABSTRACT

An artificial nail (1) has a member made of a material having electrical conductivity. The artificial nail (1) is given electrical conductivity by mixing an electrically conductive material into plastic serving as a base material. As the electrically conductive material, a carbon-based material, such as carbon black, carbon fiber, or black lead, or a metal-based material, such as a fine metal powder, a metal oxide, metal fiber, or a whisker, is used. Alternatively, the base material for the artificial nail (1) per se is an electrically conductive resin.

3 Claims, 6 Drawing Sheets

(56) References Cited

U.S. PATENT DOCUMENTS

| | | | |
|---|---|---|---|
| 2007/0280978 A1 | 12/2007 | Takada et al. | |
| 2008/0117189 A1* | 5/2008 | Flachsbart | 345/179 |
| 2008/0277630 A1 | 11/2008 | Kiyoshima et al. | |
| 2008/0297493 A1* | 12/2008 | Adkins | 345/179 |
| 2009/0241976 A1 | 10/2009 | Chang | |
| 2009/0262637 A1* | 10/2009 | Badaye et al. | 369/126 |
| 2009/0278818 A1* | 11/2009 | DiNozzi et al. | 345/179 |
| 2010/0039392 A1* | 2/2010 | Pratt et al. | 345/173 |
| 2011/0011416 A1* | 1/2011 | Burns | 132/73 |

FOREIGN PATENT DOCUMENTS

| | | | | |
|---|---|---|---|---|
| JP | 8-40832 A | 2/1996 | | |
| JP | 9-282099 A | 10/1997 | | |
| JP | 2001-252129 A | 9/2001 | | |
| JP | 2004-67532 A | 3/2004 | | |
| JP | 2006-76283 A | 3/2006 | | |
| JP | 2006-89389 A | 4/2006 | | |
| JP | 2008-297207 A | 12/2008 | | |
| JP | 2009-268893 A | 11/2009 | | |
| WO | WO2009119963 | * 10/2009 | | A45D 31/00 |

OTHER PUBLICATIONS

IT IS Foundation, Tissue Properties Database Low Frquency (Conductivity), http://www.itis.ethz.ch/itis-for-health/tissue-properties/database/low-frequency-conductivity/, pp. 1-2.*

International Search Report, issued in PCT/JP2012/059615, dated Jul. 17, 2012.

Written Opinion of the International Searching Authority, issued in PCT/JP2012/059615, dated Jul. 17, 2012.

* cited by examiner

ARTIFICIAL NAIL

TECHNICAL FIELD

The present invention relates to artificial nails and nail polish and, in particular, to an artificial nail and nail polish both designed with operationality on a capacitive touch panel in mind.

BACKGROUND ART

Figure 5:
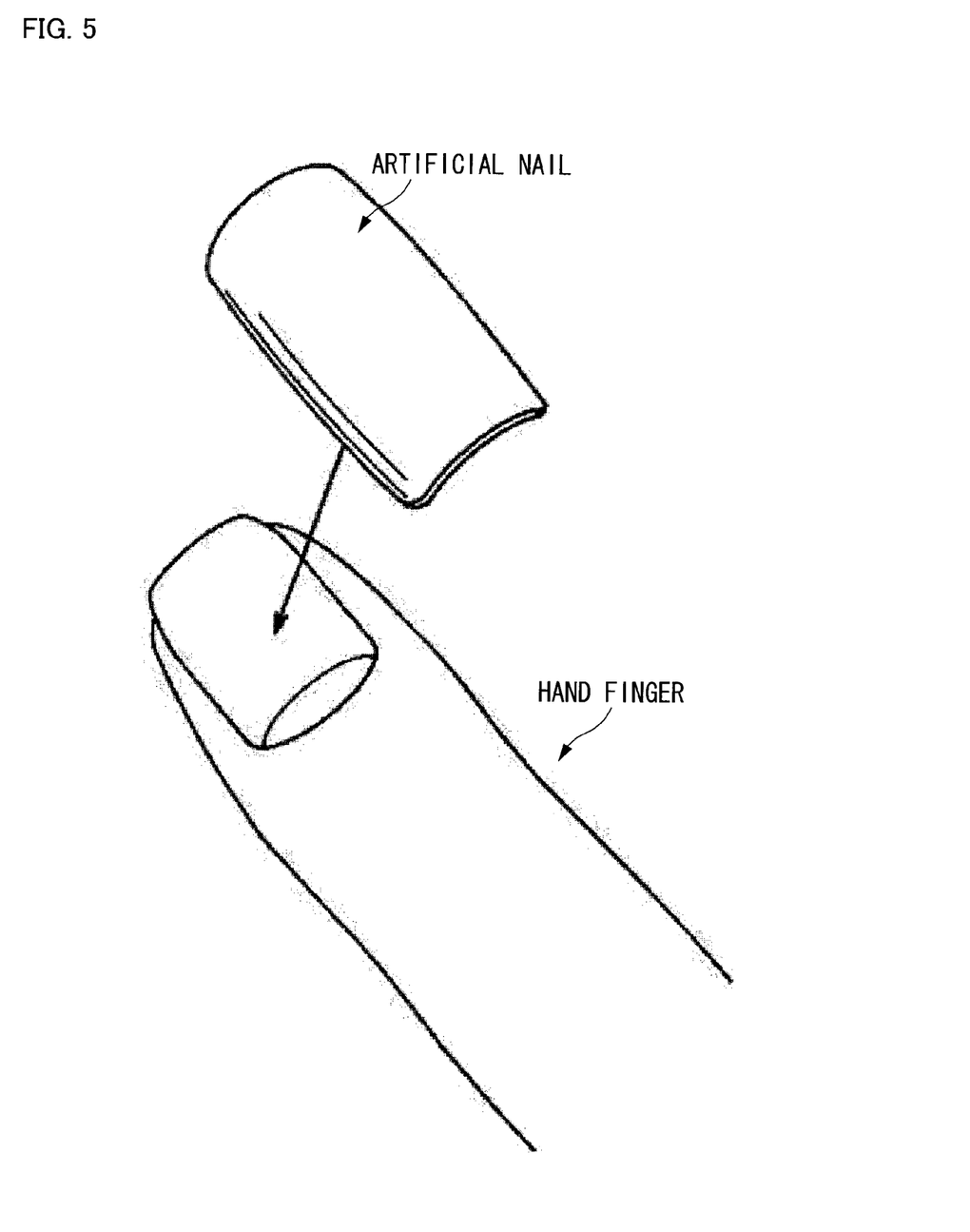
FIG. 5 is a perspective view showing a mounting state of a conventional artificial nail.

Many people, in particular women, have their nails grow long from the contour positions of their fingers or wear artificial nails for the purpose of satisfying their aesthetic needs, etc. FIG. 5 shows a mounting state of a artificial nail on a hand finger.

With long nails and artificial nails so widespread, more and more people, men and women alike, have recently come to use portable information devices such as smart phones. Furthermore, more and more of those various electronic devices, including portable information devices such as smart phones, have come with touch panels.

Resistive touch panels are in widespread use, but they suffer from the disadvantage of being unable to simultaneously detect a plurality of places touched. Under such circumstances, capacitive touch panels are coming into widespread use because of their ability to simultaneously detect a plurality of places touched.

Figure 6:
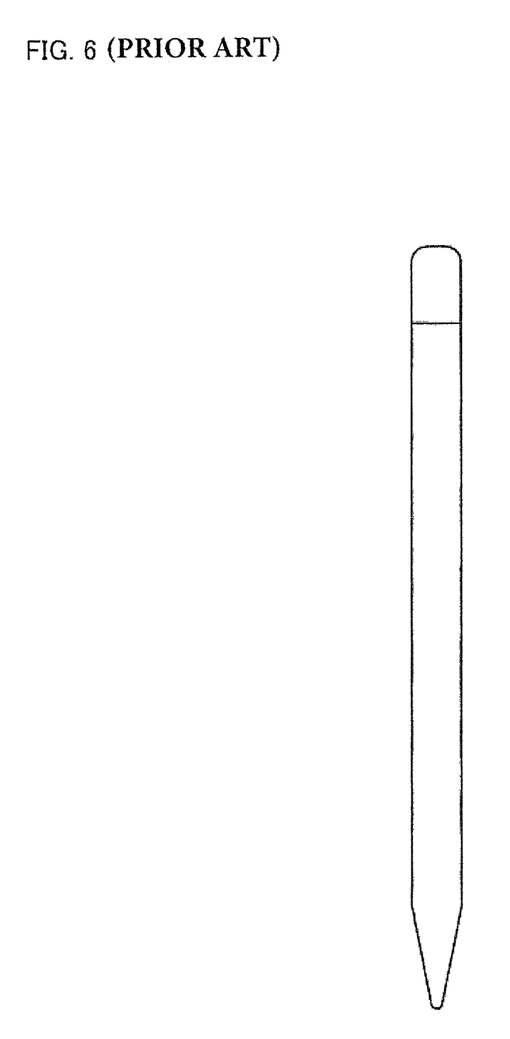
FIG. 6 is an appearance diagram showing a stylus for use in a touch operation on a touch panel.

Further, feeding of input by means of a touch panel is done through directly touching the touch panel with a finger or through using a stylus (Patent Literature 1: see FIG. 6) suited to touch panel input.

CITATION LIST

Patent Literature 1

Japanese Patent Application Publication, Tokukaihei, No. 9-282099 (Publication Date: Oct. 31, 1997)

SUMMARY OF INVENTION

Technical Problem

However, while a capacitive touch panel recognizes a touch operation carried out by touching it with a finger, it does not recognize a touch operation carried out by touching it with a nail. This is because a capacitive touch panel recognizes a touch operation by reacting to the electrical conductivity of an object having touched the panel. Since nails are poor in electrical conductivity, the touch panel does not react to a touch operation carried out by touching it with a nail.

Furthermore, with long nails and artificial nails widespread as described above in the Background Art section, such a problem arises that since a capacitive touch panel does not react to a human nail, feeding of input by means of the touch panel with a long nail or with an artificial nail is difficult.

This problem could be solved by using a stylus having electrical conductivity, but this solution requires the preparation of a stylus having electrical conductivity in advance. Further, in the case of a touch operation of touching a touch panel many times for entering sentences, etc. in writing email, use of a stylus is accompanied by fatigue of a hand holding the stylus and, what is more, may cause incorrect entry to be made by operational error. Further, there is a risk of losing the stylus, and a loss of the stylus makes operation impossible.

The present invention has been made in view of the foregoing problems, and it is an object of the present invention to provide an artificial nail and nail polish both of which allow even a person having long nails or wearing artificial nails to comfortably carry out a touch operation on a capacitive touch panel.

Solution to Problem

In order to solve the foregoing problems, an artificial nail of the present invention is an artificial nail mountable on a human nail, including an electrically conductive material as part of a material therefor.

According to the foregoing configuration, the artificial nail has electrical conductivity by containing the electrically conductive material as part of the material therefor. This makes it possible to operate a capacitive touch panel with the artificial nail mounted.

In order to solve the foregoing problems, nail polish of the present invention is nail polish to be painted on a surface of a human nail or of an artificial nail, comprising an electrically conductive material as part of a material therefor.

According to the foregoing configuration, the nail polish has electrical conductivity by containing the electrically conductive material as part of the material therefor. This makes it possible to operate a capacitive touch panel even with a long nail or an artificial nail by painting the nail polish on it.

A method of the present invention is a method for allowing a touch operation to be carried out on a capacitive touch panel with a nail, including the step of imparting electrical conductivity to an artificial nail to be mounted on the nail or to nail polish to be painted on the nail.

Advantageous Effects of Invention

An artificial nail and nail polish of the present invention is given electrical conductivity by containing an electrically conductive material as part of a material therefor. This brings about an effect of making it possible to operate a capacitive touch panel even with a long nail or an artificial nail.

DESCRIPTION OF EMBODIMENTS

Embodiments of the present invention are described below with reference to the drawings.

Embodiment 1

Figure 1:
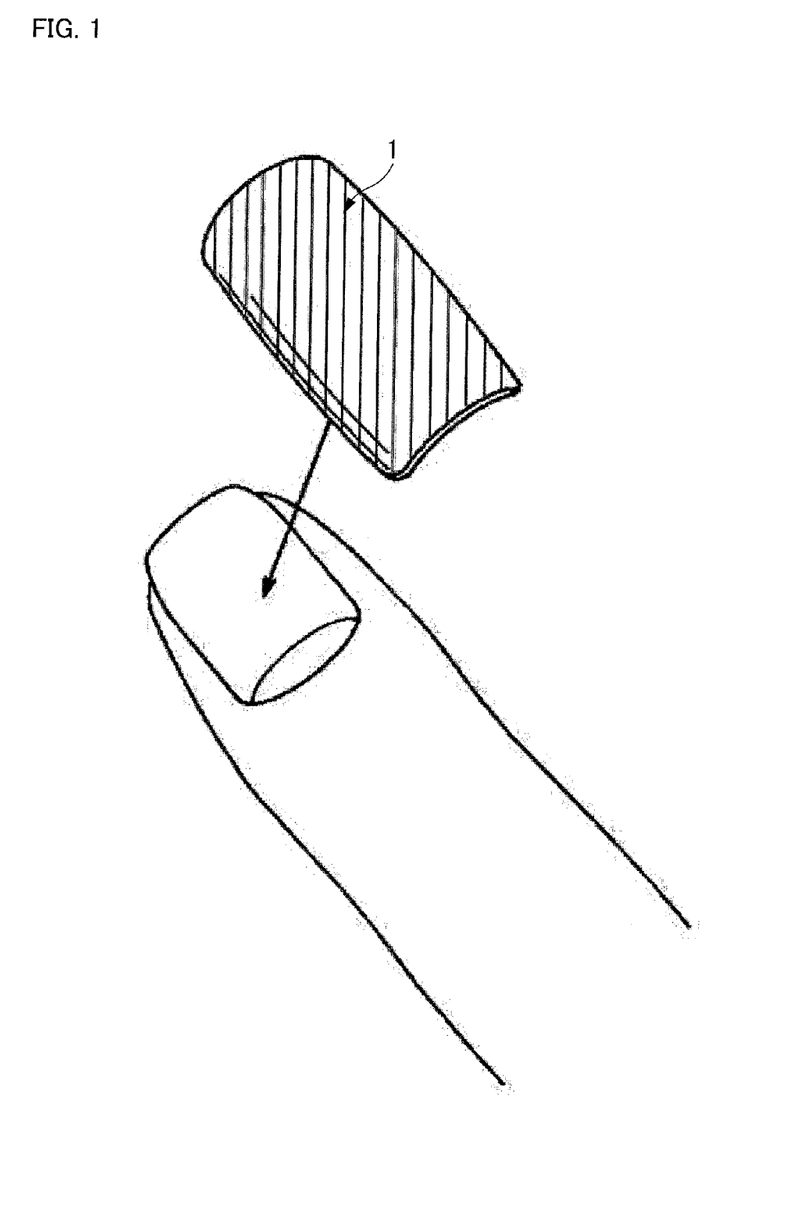
FIG. 1, showing an embodiment of the present invention, is a perspective view showing a mounting state of an artificial nail according to Embodiment 1.

Embodiment 1 is an embodiment of application of the present invention to an artificial nail. FIG. 1 shows how an artificial nail 1 according to the present embodiment 1 is mounted on a hand finger. The artificial nail 1 has an appropriate level of electrical conductivity so that a touch operation on a capacitive touch panel is possible with the artificial nail 1 mounted. For this purpose, the artificial nail 1 has a member made of a material having electrical conductivity.

The artificial nail 1 can be given electrical conductivity by mixing an electrically conductive material into plastic serving as a base material. In this case, as the plastic serving as the base material, ABS resin, nylon, acrylic resin, or the like can be used, for example. Further, as the electrically conductive material to be mixed into the base material, a carbon-based material, such as carbon black, carbon fiber, or black lead, or a metal-based material, such as a fine metal powder, a metal oxide, metal fiber, or a whisker, can be used. The electrically conductive material, made of any of these carbon- or metal-based materials, is formed into fine particles to be mixed into the base material.

Alternatively, the base material for the artificial nail 1 per se may be an electrically conductive resin. In this case, usable examples of the electrically conductive resin include a polyacrylnitrile thermal decomposition product, polyacetylene, poly copper phthalocyanine, polyvinyl anthracene iodine, polyvinylpyridine tetracyanoquinodimethane, etc.

Furthermore, the artificial nail 1 may be configured to contain glass pieces for improving its fanciness and/or synthetic fibers for improving intensity.

The artificial nail 1 can be fabricated by bending an artificial nail material given electrical conductivity as described above into the shape of a finger and, further, by cutting the artificial nail material to the size of a human nail.

It should be noted here that the artificial nail 1 may be in a shape that is larger in size than a nail of a human body on which it is mounted, and may be in such a shape as to come in contact with the skin. In this case, by coming into contact with the skin, the artificial nail 1 becomes equal in potential to the human body. This makes the artificial nail 1 more preferable. Furthermore, it is preferable that the artificial nail 1 be mounted on the human body with an adhesive made of a material having electrical conductivity.

A typical artificial nail is formed as a comparatively hard member. However, since an artificial nail according to the present invention is supposed to be used for a touch panel operation while mounted, it is preferable that the artificial nail according to the present invention be given a certain level of elasticity so as not to scratch a touch panel surface. The artificial nail 1 shown in FIG. 1 can be given an appropriate level of elasticity as a whole by using, as the base material, a resin having elasticity.

Meanwhile, since the primary role of artificial nails is to decorate nails, making the whole of an artificial nail by using a base material having elasticity may not be preferable especially in terms of giving the artificial nail glossiness. For this reason, an artificial nail 2 shown in FIG. 2 includes: an elastic member 21, which constitutes the tip of the artificial nail 2, i.e., that part of the artificial nail 2 which comes into contact with a touch panel; and a hard member 22, which constitutes a large part of the artificial nail 2.

Figure 2:
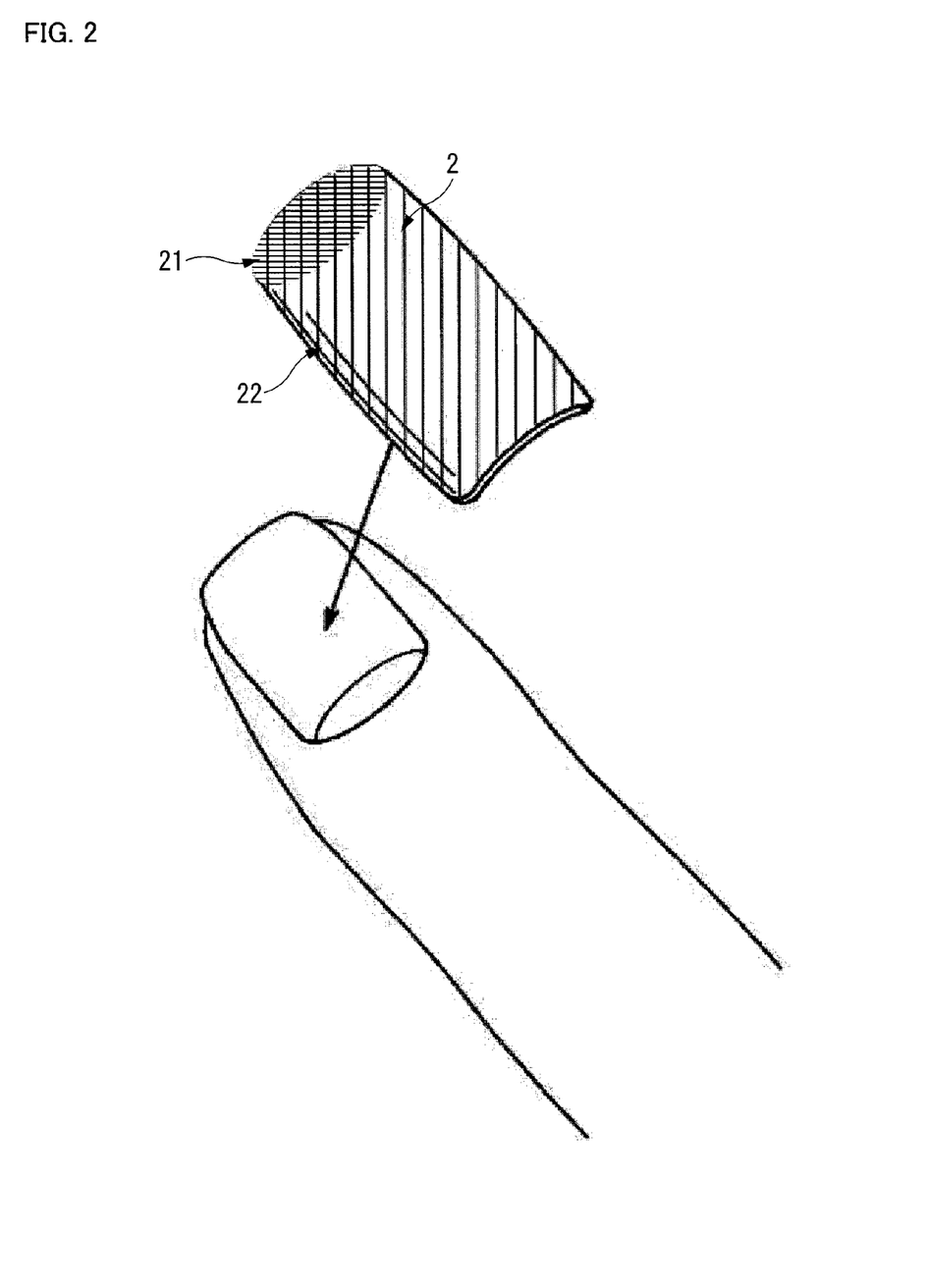
FIG. 2, showing an embodiment of the present invention, is a perspective view showing a mounting state of another artificial nail according to Embodiment 1.
Figure 3:
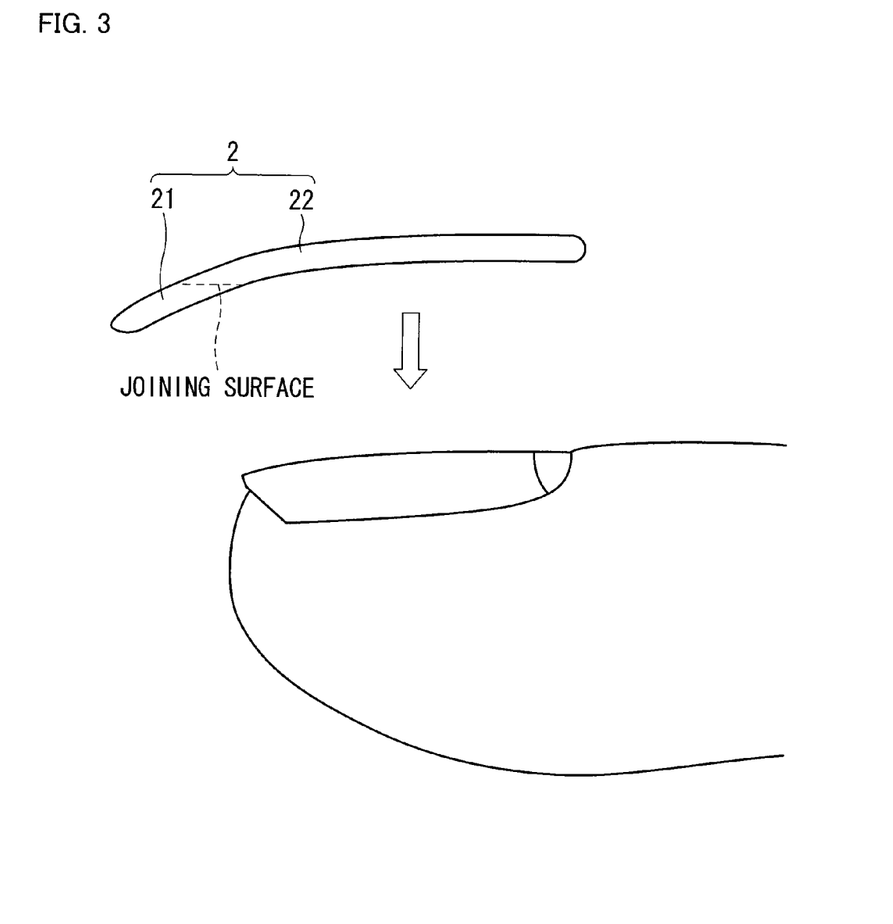
FIG. 3 is a cross-sectional view of the artificial nail shown in FIG. 2.

The elastic member 21 and the hard member 22 are joined to each other with an adhesive to form the artificial nail 2. For sufficient adhesive strength, it is preferable that as shown in FIG. 3, the joining surface be at an oblique angle to a principal surface of the artificial nail 2. This makes it possible to secure a large joining surface, so that sufficient adhesive strength can be achieved.

Furthermore, it is preferable that the joining surface be formed obliquely so as to be close to the root of a nail on the side of a mounting surface of the artificial nail and close to the tip of the nail on the side of a surface of the artificial nail. There are two reasons for this as follows: First, this allows the hard member 22, which is superior in fanciness than the elastic member 21, to have more of its area exposed on the side of the surface of the artificial nail. Second, this prevents force acting on the tip of the artificial nail during operation of a touch panel from acting on the joining surface as force that removes the elastic member 21.

Such an artificial nail having an elastic part that comes into contact with a touch panel allows a touch operation to be carried out with the artificial nail mounted, and can reduce the risk of damaging the touch panel during the touch operation.

Furthermore, it is preferable that each of the artificial nails 1 and 2 according to the present embodiment have the following features in terms of shape in view of carrying out a touch operation. First, it is preferable that that part of the artificial nail which comes into contact with a touch panel be thin. This makes it possible to carry out a touch operation that allows finer determination of a position. Second, it is preferable that that part of the artificial nail which comes into contact with a touch panel be round. This makes it possible to further reduce the risk of damaging the touch panel during a touch operation.

Mounting such an artificial nail 1 or 2 having electrical conductivity on a human finger makes it possible to operate a capacitive touch panel with the artificial nail mounted, while it has conventionally been difficult to operate a capacitive touch panel with an artificial nail mounted.

Embodiment 2

Figure 4:
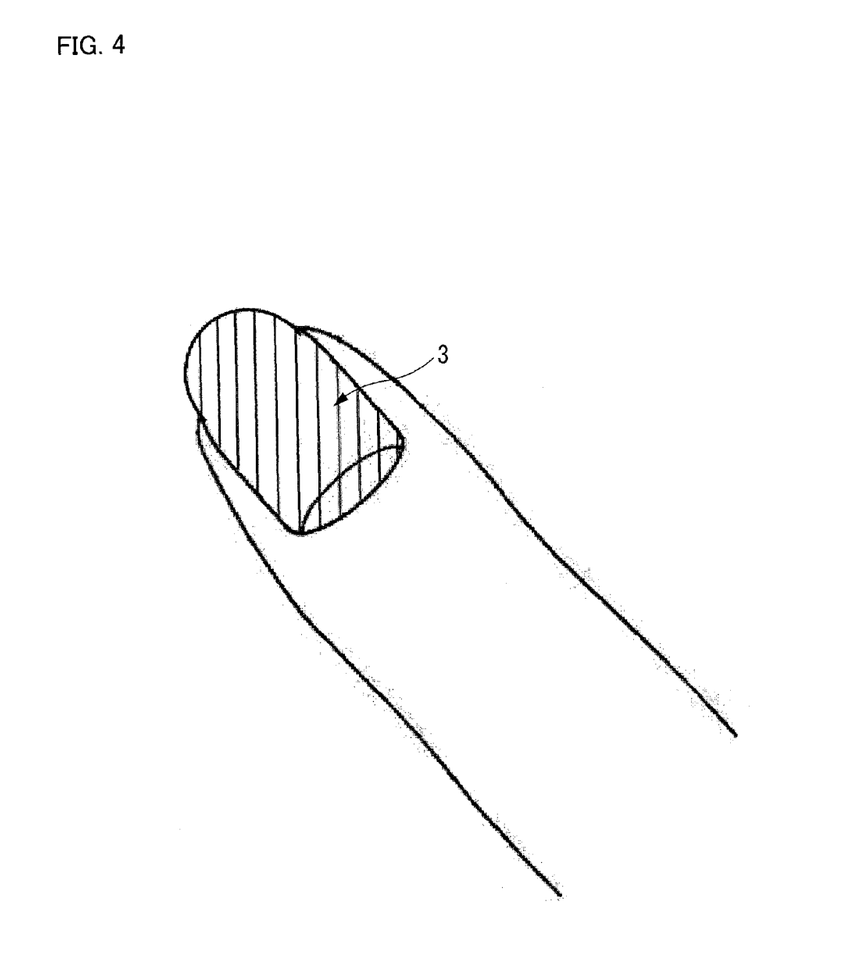
FIG. 4, showing an embodiment of the present invention, is a perspective view showing a painted state of nail polish according to Embodiment 2.

Embodiment 2 is an embodiment of application of the present invention to nail polish. FIG. 4 shows how nail polish 3 according to the present embodiment is painted on a human nail. The nail polish 3 has an appropriate level of electrical conductivity so that a touch operation on a capacitive touch panel is possible even with the nail polish 3 pained on a long nail.

The nail polish 3 can be rendered electrically conductive by mixing an electrically conductive material into a backing material serving as a base. As the electrically conductive material, a carbon-based material, such as carbon black, carbon fiber, or black lead, or a metal-based material, such as a fine metal powder, a metal oxide, a metal fiber, or a whisker, can be used. The electrically conductive material, made of any of these carbon- or metal-based materials, is formed into fine particles to be mixed into the base material.

Further, the electrically conductive material to be mixed into the backing material may be an electrically conductive resin such as a polyacrylnitrile thermal decomposition product, polyacetylene, poly copper phthalocyanine, polyvinyl anthracene iodine, polyvinylpyridine tetracyanoquinodimethane.

Furthermore, the nail polish 3 may be configured to contain glass pieces for improving its fanciness and/or synthetic fibers for improving intensity after painting and drying.

Painting such nail polish on a long nail makes it possible to operate a capacitive touch panel with the long nail, while it has conventionally been difficult to operate a capacitive touch panel with a long nail. Alternatively, even in the case of an artificial nail having no electrical conductivity, paining the nail polish on the artificial nail makes it possible to operate a capacitive touch panel with the artificial nail.

General Overview of the Embodiments

The artificial nails and nail polish according to Embodiments 1 and 2 impart electrical conductivity to the tip of a nail to allow a touch operation on a capacitive touch panel. It should be noted, however, that the "electrical conductivity" here needs only be at a level of electrical conductivity to which a capacitive touch panel can surely react.

That is, from the point of view of the functionality of the artificial nail and nail polish of the present invention to surely operate a capacitive touch panel, there is no particular upper limit on electrical conductivity. However, from the point of view of fanciness, a high mixing rate of the electrically conductive material composed of a carbon- or metal-based material may cause a decrease in color and/or glossiness. For this reason, there may be a possibility that a demand for as low as possible a mixing rate of the electrically conductive material may arise. In such a case, the electrical conductivity of the artificial nail and nail polish needs only be at the same level (1000 to 20000 μS/cm) as the electrical conductivity of the human body, with the mixing rate of the electrically conductive material kept to a minimum within that range.

The embodiments disclosed herein should be considered as illustrative, but not restrictive, in all respects. The scope of the present invention is not defined by the description above, but by the scope of claims, and is intended to encompass meanings equivalents the scope of the claims and all variations within the scope.

Further, the artificial nail can be configured to have such a shape as to be brought into contact with skin of a human body on which it is mounted. Thus, by coming into contact with the skin as well as the human nail on which it is mounted, the artificial nail becomes equal in potential to the human body. This makes the artificial nail more preferable.

Further, the artificial nail can be configured to have elasticity as a whole. With this, that part of the artificial nail which comes into contact with a touch panel also has elasticity, so that a surface of the touch panel is less scratched during a touch operation. Further, in the case of imparting elasticity to the whole of an artificial nail, each artificial nail can be fabricated as a single member. This makes the fabrication easy.

Further, the artificial nail can be configured to have a tip part of which is constituted by an elastic member. With this, that part of the artificial nail which comes into contact with a touch panel also has elasticity, so that a surface of the touch panel is less scratched during a touch operation. Further, in part of the artificial nail other than the tip, it is possible to select a material that places priority on the fanciness, such as color and/or glossiness, of the artificial nail.

Further, the artificial nail can be configured to have a same level of electrical conductivity as a human body. This allows the artificial nail to, while ensuring the function of surely operating a capacitive touch panel, minimize a decrease in fanciness of the artificial nail due to mixing of the electrically conductive material.

Further, the artificial nail may be configured such that the electrically conductive material is a carbon-based material, a metal-based material, or an electrically conductive resin.

Further, the nail polish can be configured to have a same level of electrical conductivity as a human body. This allows the nail polish to, while ensuring the function of surely operating a capacitive touch panel, minimize a decrease in fanciness of the nail polish due to mixing of the electrically conductive material.

Further, the nail polish may be configured such that the electrically conductive material is a carbon-based material, a metal-based material, or an electrically conductive resin.

INDUSTRIAL APPLICABILITY

The present invention imparts electrical conductivity to the tip of a nail and thereby allows a touch operation to be carried out on a capacitive touch panel with a long nail or an artificial nail, and as such, can be used for an artificial nail and polish nail.

REFERENCE SIGNS LIST 1, 2 Artificial nail
3 Nail polish
21 Elastic member
22 Hard member

The invention claimed is:

1. An artificial nail mountable on a human nail for operating capacitive touch panels, comprising:
   a hard base member forming a majority of the artificial nail, said hard base member having a lower mounting side opposite an upper principal side and a proximal cuticle end opposite a distal joining portion;
   an elastic tip member forming a distal tip portion of the artificial nail, said elastic tip member having a lower mounting side opposite an upper principal side and a distal end opposite a proximal joining portion,
   said elastic tip member and said hard base member being joined to each other at a joining surface formed by overlapping and adhering said respective joining portions such that the mounting sides form a continuous mounting surface of said artificial nail and the principal sides form a continuous principal surface of said artificial nail, and
   said joining surface has a proximal end at said mounting surface and a distal end at said principal surface such that said joining surface is at an oblique angle to said principal surface of said artificial nail,
   wherein the elastic tip member and the hard base member are made from
   an electrically conductive material mixed with a base material, and an amount of the electrically conductive material is a value which provides said artificial nail with an electrical conductivity that is equal to and not greater than an electrical conductivity of a human body.

2. The artificial nail as set forth in claim 1, wherein the electrically conductive material is a carbon-based material, a metal-based material, or an electrically conductive resin.

3. An artificial nail mountable on a human nail for operating capacitive touch panels, comprising:
   a hard base member forming a majority of the artificial nail, said hard base member having a lower mounting side opposite an upper principal side and a proximal cuticle end opposite a distal joining portion;
   an elastic tip member forming a distal tip portion of the artificial nail, said elastic tip member having a lower mounting side opposite an upper principal side and a distal end opposite a proximal joining portion;
   said elastic tip member and said hard base member being joined to each other at a joining surface formed by overlapping and adhering the respective joining portions such that said mounting sides form a continuous mounting surface of said artificial nail and said principal sides form a continuous principal surface of said artificial nail, and
   said joining surface has a proximal end at the mounting surface and a distal end at the principal surface such that said joining surface is at an oblique angle to the principal surface of the artificial nail,
   wherein the elastic tip member and the hard base member are made from electrically conductive material providing said artificial nail with an electrical conductivity that is equal to and not greater than an electrical conductivity of a human body.

* * * * *